(12) United States Patent
Thorn

(10) Patent No.: US 7,920,179 B2
(45) Date of Patent: Apr. 5, 2011

(54) SHADOW AND REFLECTION IDENTIFICATION IN IMAGE CAPTURING DEVICES

(75) Inventor: Ola Karl Thorn, Malmo (SE)

(73) Assignee: Sony Ericsson Mobile Communications AB, Lund (SE)

(*) Notice: Subject to any disclaimer, the term of this patent is extended or adjusted under 35 U.S.C. 154(b) by 430 days.

(21) Appl. No.: 12/186,162

(22) Filed: Aug. 5, 2008

(65) Prior Publication Data

US 2010/0033588 A1    Feb. 11, 2010

(51) Int. Cl.
*H04N 5/262* (2006.01)
*H04N 5/222* (2006.01)
*G06K 9/40* (2006.01)

(52) U.S. Cl. ... 348/239; 348/371; 348/370; 348/333.03; 382/275; 382/274

(58) Field of Classification Search .................. 348/371, 348/370, 207.99, 221.1, 333.11, 333.12, 348/333.03, 333.04, 239; 382/274, 275, 382/260, 286, 107
See application file for complete search history.

(56) References Cited

U.S. PATENT DOCUMENTS

| | | | |
|---|---|---|---|
| 5,943,516 A | 8/1999 | Uchiyama et al. | |
| 6,301,440 B1 * | 10/2001 | Bolle et al. | 396/128 |
| 6,314,241 B1 | 11/2001 | Matsumura | |
| 6,351,606 B1 | 2/2002 | Yamazaki | |
| 7,305,127 B2 * | 12/2007 | Wells | 382/168 |
| 7,684,630 B2 * | 3/2010 | Steinberg | 382/243 |
| 2002/0101512 A1 | 8/2002 | Klapman et al. | |
| 2003/0128337 A1 * | 7/2003 | Jaynes et al. | 353/30 |
| 2006/0170769 A1 * | 8/2006 | Zhou | 348/143 |
| 2007/0104389 A1 * | 5/2007 | Wells | 382/274 |

FOREIGN PATENT DOCUMENTS

| | | | |
|---|---|---|---|
| JP | 2005-78291 | | 3/2005 |
| JP | 2005078291 A | * | 3/2005 |
| JP | A2007-074136 | | 7/2007 |

OTHER PUBLICATIONS

J. Stauder et al., "Detection of Moving Cast Shadows for Object Segmentation"—IEEE Transactions on Multimedia, vol. 1, No. 1, pp. 65-76 (Mar. 1999).*

(Continued)

*Primary Examiner* — Lin Ye
*Assistant Examiner* — Marly Camargo
(74) *Attorney, Agent, or Firm* — Harrity & Harrity, LLP

(57) ABSTRACT

A device may include an image capturing assembly to frame an image of a subject for capturing; and a processor to automatically identify a shadow or a reflection corresponding to a user of the device in the framed image. The image capturing assembly is configured to capture the image following the automatic identification of the shadow or the reflection. The processor is configured to perform one of: adjusting the image capturing assembly based on the automatic identification of the shadow or the reflection prior to the capturing of the image, or modifying the captured image based on the automatic identification of the shadow or the reflection.

20 Claims, 9 Drawing Sheets

OTHER PUBLICATIONS

GestureTek, "Gesture Recognition & Computer Vision Control Technology & Motion Sensing Systems . . . ", http://www.gesturetek.com, Aug. 5, 2008 (Print Date).

Diaz De Leon, R. and Sucar, L.E., "Human Silhouette Recognition with Fourier Descriptors", Abstract only, IEEE Xplore Release 2.5, http://ieeexplore.ieee.org/xpl/freeabs_all.jsp?arnumber =903643, Aug. 5, 2008 (Print Date).

Stauder et al., "Detection of Moving Cast Shadows for Object Segmentation", IEEE Transactions on Multimedia, vol. 1, No. 1, Mar. 1999, pp. 65-76.

Invitation to Pay Additional Fees and, Where Applicable, Protest Fee with the Partial International Search corresponding to PCT/IB2009/050442, dated Apr. 27, 2009, 6 pages.

Stauder et al., "Detection of Moving Cast Shadows for Object Segmentation", IEEE Transactions of Multimedia, IEEE Service Center, vol. 1 No. 1, 1999, pp. 65-76.

Notification of Transmittal of the International Search Report and the Written Opinion of the International Searching Authority, or the Declaration corresponding to PCT/IB2009/050442, dated Jun. 15, 2009, 23 pages.

* cited by examiner

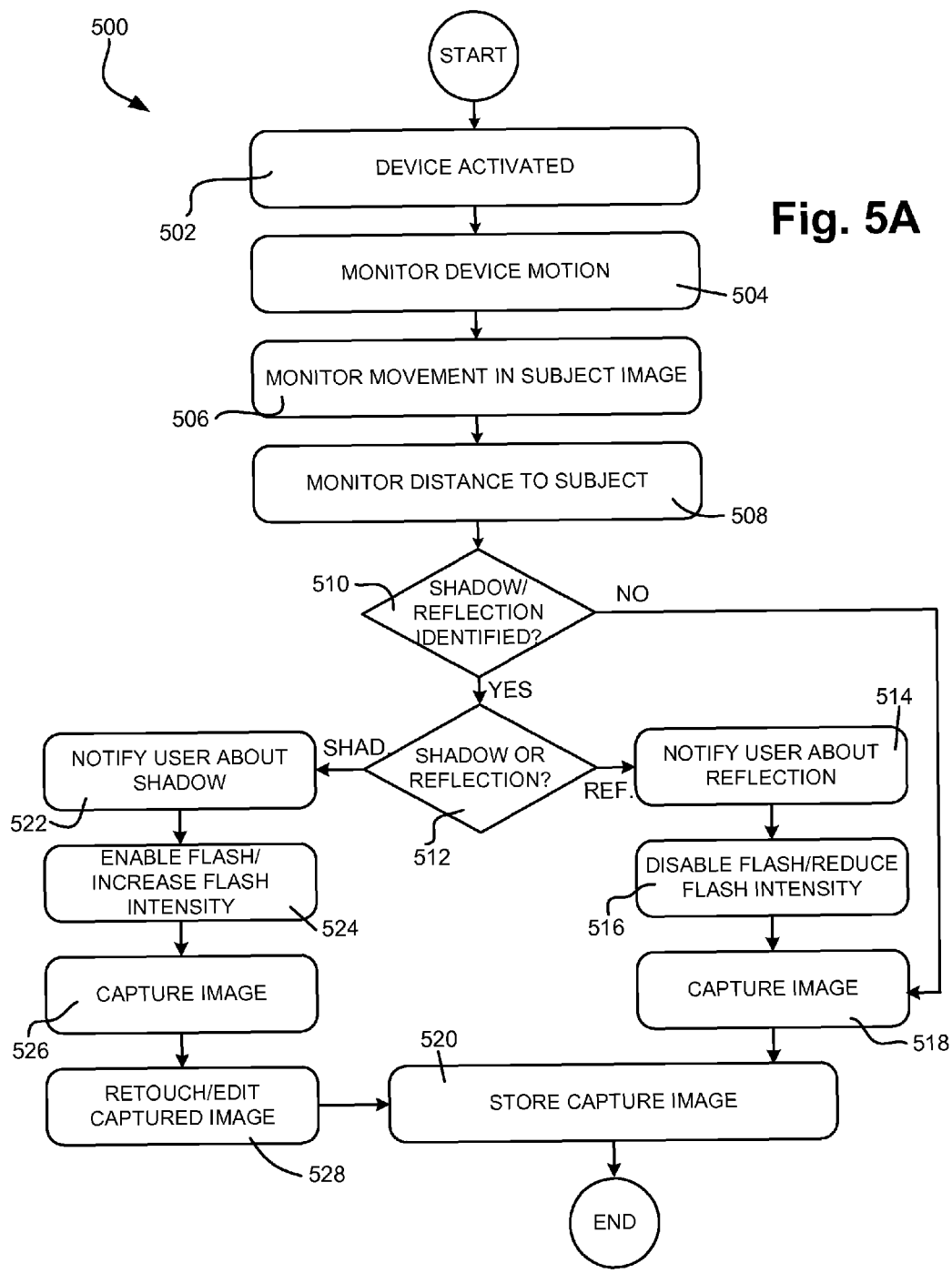

SHADOW AND REFLECTION IDENTIFICATION IN IMAGE CAPTURING DEVICES

BACKGROUND

Many of today's camera devices have the ability to aid a photographer in focusing, white balancing, and/or adjusting shutter speed. For focusing, a camera may use ultrasound or infrared sensors to measure the distance between a subject and the camera. For white balancing, the camera may digitally modify a color component of a picture to improve its quality. For adjusting shutter speed, the camera may determine the optimal exposure of photoelectric sensors to light within the camera. Unfortunately, existing camera devices do not assist users in correcting many types of photographic problems.

SUMMARY

According to one aspect, a device may include an image capturing assembly to frame an image of a subject for capturing; and a processor to automatically identify a shadow or a reflection corresponding to a user of the device in the framed image. The image capturing assembly is configured to capture the image following the automatic identification of the shadow or the reflection. The processor is configured to perform one of: adjusting the image capturing assembly based on the automatic identification of the shadow or the reflection prior to the capturing of the image, or modifying the captured image based on the automatic identification of the shadow or the reflection.

Additionally, a sensor may monitor characteristics of the device and the framed image, where the automatically identifying the shadow or the reflection is based on the monitored characteristics.

Additionally, the sensor may include a motion sensor for monitoring movement associated with the device, where the processor is configured to determine whether movement in at least a portion of the framed image corresponds to the movement monitored by the motion sensor, and where the processor is configured to identify the shadow or reflection when movement in at least a portion of the framed image corresponds to the movement monitored by the motion sensor.

Additionally, the motion sensor may include an accelerometer, a gyroscope, or a virtual accelerometer.

Additionally, the sensor may further include a distance meter to measure a distance from the device to the subject, where the processor is configured to identify the shadow or reflection when movement in at least a portion of the framed image corresponds to the movement monitored by the motion sensor and further based on the measured distance.

Additionally, the sensor may include a light direction sensor to determine a direction of light incident on the subject and a database to store shapes or silhouettes corresponding to the user. The processor may be configured to identify shapes or silhouettes in the framed image; determine whether an identified shape or silhouette in the framed image matches one of the shapes or silhouettes stored in the database; and automatically identify the shadow or the reflection corresponding to the user when the identified shape or silhouette in the framed image matches one of the shapes or silhouettes stored in the database and further based on the direction of light incident on the subject.

Additionally, the image capturing assembly may include a lens assembly to receive the framed image and a viewfinder or display to present the framed image to the user.

Additionally, adjusting the image capturing assembly based on the automatic identification of the shadow or the reflection prior to the capturing of the image further includes presenting a notification in the viewfinder or display, the notification indentifying the existence of the shadow or reflection.

Additionally, the notification may identify the location of the shadow or reflection in the framed image.

Additionally, adjusting the image capturing assembly based on the automatic identification of the shadow or the reflection prior to the capturing of the image further includes adjusting a flash associated with the device to reduce an effect of the shadow or reflection in the captured image.

Additionally, adjusting the flash may include activating or increasing the flash when a shadow is identified and deactivating or decreasing the flash when a reflection is identified.

Additionally, modifying the captured image based on the automatic identification of the shadow or the reflection may include automatically editing the captured image to remove the shadow or the reflection.

According to another aspect, a method may include framing an image for capturing in an image capturing device, where the image includes a subject; automatically determining whether a user-based artifact appears in the framed image; and notifying a user of the image capturing device when user-based artifacts appear in the framed image.

Additionally, automatically determining whether a user-based artifact appears in the framed image may include monitoring movement associated with the image capturing device; identifying movement in the framed image; determining whether the movement in the framed image corresponds to the movement associated with the image capturing device; and determining that the framed image includes the user-based artifact when the movement in the framed image corresponds to the movement associated with the image capturing device.

Additionally, monitoring movement of the image capture device may be performed by a motion sensor that includes an accelerometer, a gyroscope, or a virtual accelerometer.

Additionally, automatically determining whether a user-based artifact appears in the framed image may include measuring a distance from the image capturing device to the subject; and determining that the framed image includes the user-based artifact when the movement in the framed image corresponds to the movement associated with the image capturing device and further based on the measured distance.

Additionally, automatically determining whether a user-based artifact appears in the framed image may include storing a number of shapes or silhouettes associated with the user; determining a direction of light incident on the subject; identifying a shape or silhouette in the framed image; determining whether the identified shape or silhouette in the framed image matches one of the stored shapes or silhouettes associated with the user; and determining that the user-based artifact appears in the framed image when the identified shape or silhouette in the framed image matches one of the stored shapes or silhouettes associated with the user and further based on the direction of light incident on the subject.

Additionally, the method may include capturing the framed image; automatically editing the captured image to reduce an effect of the user-based artifact on the captured image; and storing the captured image.

According to yet another aspect, a device may include means for framing an image of a subject for capturing; means for automatically identifying a shadow corresponding to a user of the device in the framed image; means for notifying the user about the identified shadow; means for capturing the framed image based on the identified shadow, such that effects of the identified shadow in the captured image are reduced; and means for storing the captured image.

Additionally, the means for capturing the framed image based on the identified shadow, such that effects of the identified shadow in the captured image are reduced, may further include at least one of: means for adjusting a flash during capturing of the image to reduce the effects of the identified shadow; or means for automatically editing the captured image to remove the identified shadow.

BRIEF DESCRIPTION OF THE DRAWINGS

The accompanying drawings, which are incorporated in and constitute a part of this specification, illustrate one or more embodiments described herein and, together with the description, explain the embodiments. In the drawings:

FIGS. 5A and 5B are flowcharts of an exemplary process for automatically identifying a user's shadow or a reflection in a subject image;

DETAILED DESCRIPTION OF EMBODIMENTS

The following detailed description refers to the accompanying drawings. The same reference numbers in different drawings may identify the same or similar elements.

In implementations described herein, a device (e.g., a camera) may aid a user in taking pictures. In particular, the device may, using a variety of techniques, identify a shadow and/or reflection (or other user-based artifact) associated with the user of the device in an image capture area. Once such a shadow or reflection is identified, a variety of optional processing steps may be performed. In one implementation, the user may be notified of the presence of an unwanted shadow or reflection. In another implementation, a flash may be activated or modified to remove the shadow from an image taken by the device. Alternatively, use of a flash may be disabled or a notification regarding consequences of flash use may be made when a reflection is identified. In still another implementation, an image editing application may automatically retouch or edit a captured image to remove or reduce the effect of the shadow or reflection.

For example, assume that a user wishes to take a photographic shot of a specific subject, such as a person, an event, an inanimate object, etc. In preparing to take the shot, the user directs the device's camera lens towards the subject. Consistent with embodiments disclosed herein, the device may dynamically analyze, prior to capturing of the image, the framed image area to be captured, and may dynamically identify shadows and/or reflections that are associated with the user and which the user may not wish to have included in the captured image.

In the event that a shadow or reflection is identified, various steps may be taken to either notify a user of the possible effects of the visible shadow or to ameliorate the effects automatically upon capturing of the image.

Figure 1A:
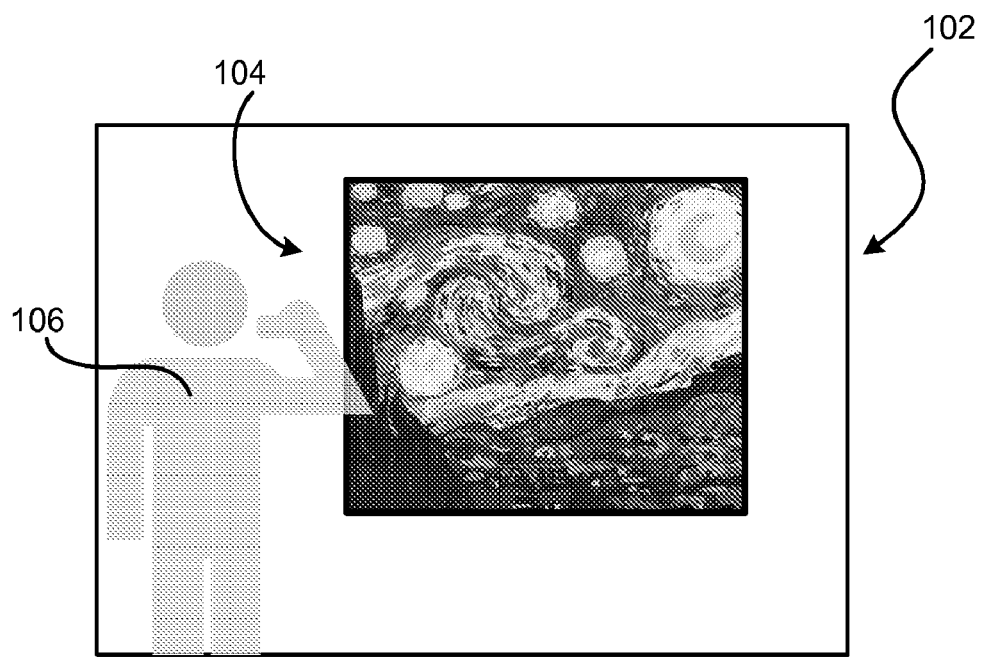
FIGS. 1A and 1B show an exemplary viewfinder/display of an exemplary device in which concepts described herein may be implemented.
Figure 1B:
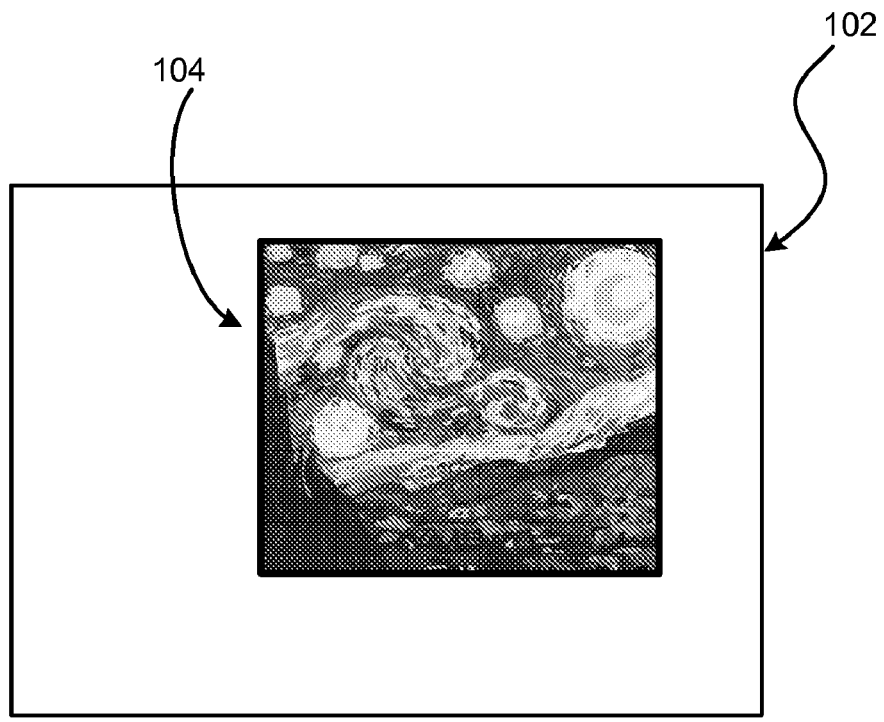

FIGS. 1A and 1B show an exemplary viewfinder/display of an exemplary device in which concepts described herein may be implemented. FIG. 1A shows a viewfinder/display 102 with a subject image 104. As discussed above, the camera may dynamically identify the existence of shadow 106 associated with the camera's user. Once shadow 106 has been identified, the camera may capture subject image 104 and, in one implementation, may automatically edit the captured image to remove (or substantially remove) shadow 106, as illustrated in FIG. 1B.

The term "image," as used herein, may refer to a digital or an analog representation of visual information (e.g., a picture, a video, a photograph, animations, etc). The term "camera," as used herein, may include a device that may capture images. For example, a digital camera may include an electronic device that may capture and store images electronically instead of using photographic film. A digital camera may be multifunctional, with some devices capable of recording sound and/or images. A "subject," as the term is used herein, is to be broadly interpreted to include any person, place, and/or thing capable of being captured as an image. The term "subject image" may refer to an image of a subject. The term "frame" may refer to a closed, often rectangular, border of lines or edges (physical or logical) that enclose the picture of a subject.

Exemplary Device

Figure 2A:
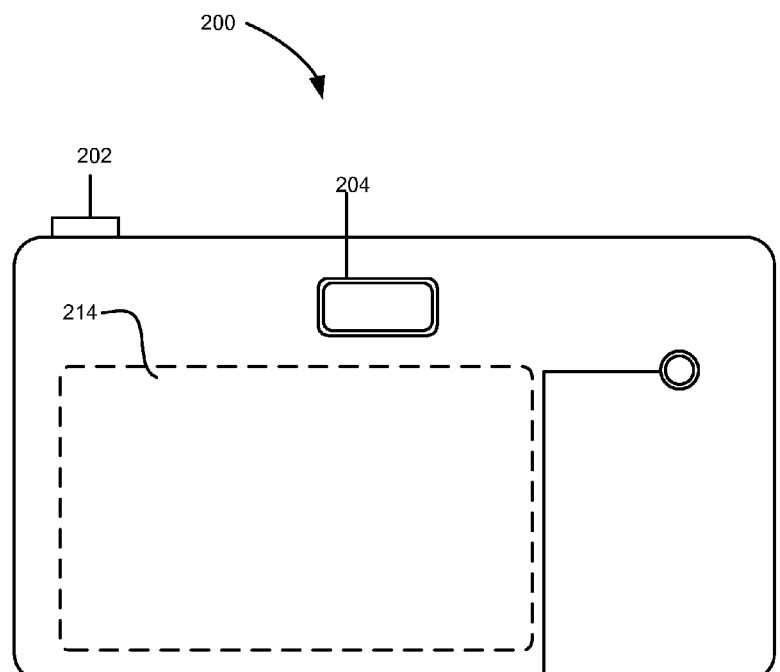
FIGS. 2A and 2B are front and rear views, respectively, of an exemplary device in which concepts described herein may be implemented.
Figure 2B:
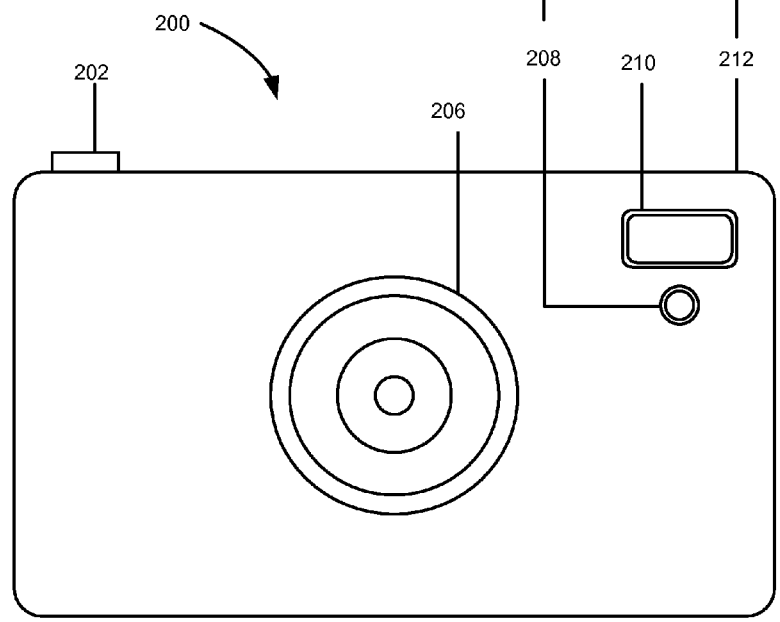

FIGS. 2A and 2B are front and rear views, respectively, of an exemplary device 200 in which concepts described herein may be implemented. In this implementation, device 200 may take the form of a camera (e.g., a standard 35 mm or digital camera). As shown in FIGS. 2A and 2B, device 200 may include a button 202, a viewfinder/display 204, a lens assembly 206, sensors 208, a flash 210, housing 212, and display 214. Button 202 may permit the user to interact with device 200 to cause device 200 to perform one or more operations, such as taking a picture. Viewfinder/display 204 may provide visual information to the user, such as an image of a view, video images, pictures, etc. Lens assembly 206 may include an image capturing assembly for manipulating light rays from a given or a selected range, so that images in the range can be captured in a desired manner. Sensors 208 may collect and provide, to device 200, information (e.g., acoustic, infrared, etc.) that may be used to aid the user in capturing images. For example, sensors 208 may provide acoustic information that may be used for automatically focusing an image. Flash 210 may include any type of flash unit used in cameras and may provide illumination for taking pictures. Housing 212 may provide a casing for components of device 200 and may protect the components from outside elements. Display 214 may provide a larger visual area for presenting the contents of viewfinder/display 204 as well as providing visual feedback regarding previously captured images or other information.

Figure 3:
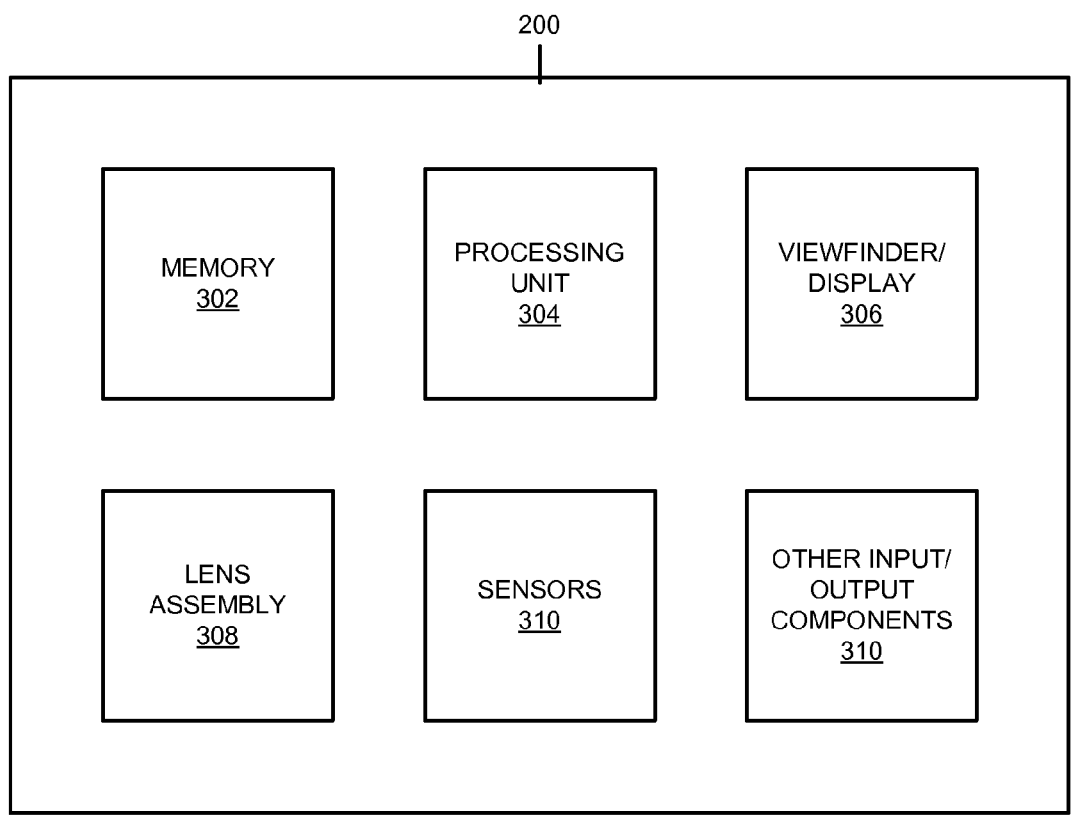
FIG. 3 is a block diagram of exemplary components of the exemplary device of FIGS. 2A and 2B.

FIG. 3 is a block diagram of exemplary components of device 200. The term "component," as used herein, may refer to hardware component, a software component, or a combination of the two. As shown, device 200 may include a memory 302, a processing unit 304, a viewfinder/display 306, a lens assembly 308, sensors 310, and other input/output components 312. In other implementations, device 200 may include more, fewer, or different components.

Memory 302 may include static memory, such as read only memory (ROM), and/or dynamic memory, such as random access memory (RAM), or onboard cache, for storing data and machine-readable instructions. Memory 302 may also include storage devices, such as a floppy disk, CD ROM, CD read/write (R/W) disc, and/or flash memory, as well as other types of storage devices. Processing unit 304 may include a processor, a microprocessor, an Application Specific Integrated Circuit (ASIC), a Field Programmable Gate Array (FPGA), and/or other processing logic capable of controlling device 200.

Viewfinder/display 306 may include a component that can display signals generated by device 200 as images on a screen and/or that can accept inputs in the form of taps or touches on the screen. For example, viewfinder/display 306 may provide a window through which the user may view images that are received from lens assembly 308. Examples of viewfinder/display 306 include an optical viewfinder (e.g., a reversed telescope), liquid crystal display (LCD), organic light-emitting diode (OLED) display, surface-conduction electron-emitter display (SED), plasma display, field emission display (FED), bistable display, and/or a touch screen. In an alternative implementation, device 200 may include display 214 for enabling users to preview images that are received from lens assembly 308 prior to capturing. Subsequent to image capturing, display 214 may allow for review of the captured image.

Lens assembly 308 may include a component for manipulating light rays from a given or a selected range, so that images in the range can be captured in a desired manner (e.g., a zoom lens, a wide-angle lens, etc.). Lens assembly 308 may be controlled manually and/or electromechanically by processing unit 304 to obtain the correct focus, span, and magnification (i.e., zoom) of the subject image and to provide a proper exposure.

Sensors 310 may include one or more devices for obtaining information related to image, luminance, focus, zoom, sound, distance, movement of device 200, and/or orientation of device 200. Sensors 310 may provide the information to processing unit 304, so that processing unit 304 may control lens assembly 308 and/or other components that together form an image capturing assembly. Examples of sensors 310 may include a complementary metal-oxide-semiconductor (CMOS) sensor and/or charge-coupled device (CCD) sensor for sensing light, a gyroscope for sensing the orientation of device 200, an accelerometer for sensing movement of device 200, an infrared signal sensor or an ultrasound sensor for measuring a distance from a subject to device 200, a microphone; etc. Other input/output components 312 may include components for converting physical events or phenomena to and/or from digital signals that pertain to device 200. Examples of other input/output components 312 may include a flash, button, mouse, speaker, microphone, Universal Serial Bus (USB) port, IEEE 1394 (e.g., Firewire®) interface, etc.

In other implementations, device 200 may include other components, such as a network interface. If included in device 200, the network interface may include any transceiver-like mechanism that enables device 200 to communicate with other devices and/or systems. For example, the network interface may include mechanisms for communicating via a network, such as the Internet, a terrestrial wireless network (e.g., wireless local area network (WLAN)), a satellite-based network, etc. Additionally or alternatively, the network interface may include a modem, an Ethernet interface to a local area network (LAN), and/or an interface/connection for connecting device 200 to other devices (e.g., a Bluetooth interface).

Figure 4:
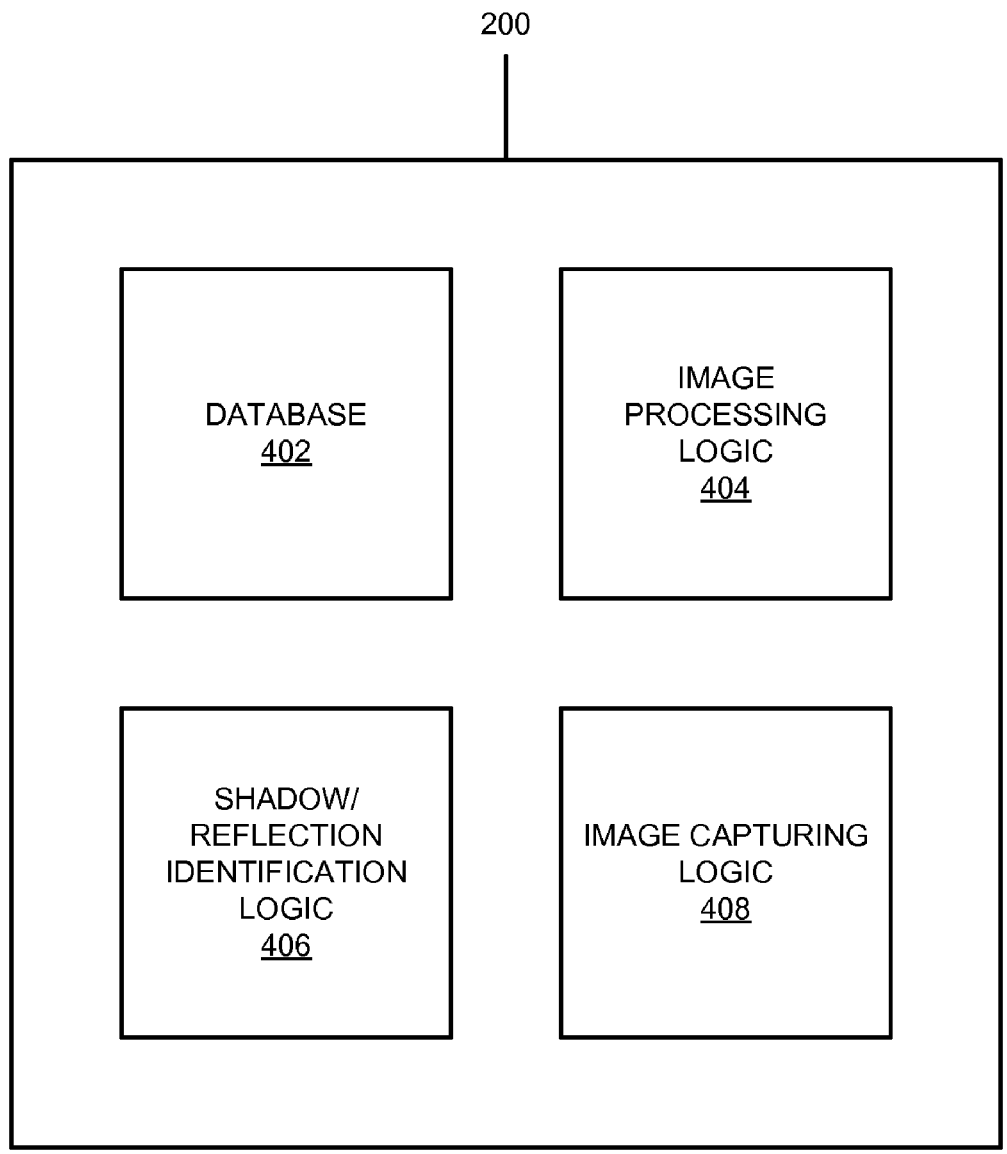
FIG. 4 is a functional block diagram of the exemplary device of FIGS. 2A and 2B.

FIG. 4 is a functional block diagram of device 200. As shown, device 200 may include a database 402, image processing logic 404, shadow/reflection identification logic 406, and/or image capturing logic 408. Depending on the particular implementation, device 200 may include fewer, additional, or different types of functional blocks than those illustrated in FIG. 4.

Database 402 may be included in memory 302 (FIG. 3) and act as an information repository for the components of device 200. For example, in one implementation, database 402 may store or maintain images (e.g., pictures, video clips, etc.) that may be stored and/or accessed by image processing logic 404 and/or shadow/reflection identification logic 406. In another example, database 402 may store or maintain audio files (e.g., audio clips, ring tones, etc.).

Image processing logic 404 may include hardware and/or software for processing images before/after the images are captured, such as, for example, in response to shad/reflection identification by shadow/reflection identification logic 406. For example, image processing logic 404 may automatically edit a captured image to remove or ameliorate an indentified shadow or reflection. In another example, image processing logic 404 may activate, deactivate, or adjust a flash associated with device 200 to reduce an effect resulting from an identified shadow or reflection.

Shadow/reflection identification logic 406 may include hardware and/or software for identifying the existence of shadows or reflections associated with the user of device 200. For example, as will be discussed in additional detail below, shadow/reflection identification logic 406 may use inputs from various ones of sensors 310 to identify the user's shadow or reflection.

In one implementation, shadow/reflection identification logic 406 may monitor a motion of device 200 using, for example, an accelerometer or gyroscope. In other implementations, device motion may be determined based on image analysis, such as by a camera assembly or other image capture device, without relying on additional accelerometer or gyroscope-based sensors. Such an implementation may be referred to as a "virtual accelerometer." Shadow/reflection identification logic 406 may simultaneously analyze the subject image provided by lens assembly 308 for elements sharing substantially similar movement characteristics. For example, a user's shaking or moving hand (or hands) may cause device 200 to move, the movement being sensed by the accelerometer or gyroscope (e.g., by sensors 310). Similarly, in the event that the user's shadow or reflection is in the subject image, the user's movement of device 200 may also cause a portion of the subject image to also move in a substantially similar manner, this movement being captured via lens assembly 308. Additionally, shadow/reflection identification logic 406 may use a distance to the subject determined by a distance metering sensor. By comparing the movement experienced by device 200 with the image movement captured by lens assembly 308 and adjusted for the measured distance to the subject, shadow/reflection identification logic 406 may determine that the portion of the subject image sharing the movement is associated with the user of device 200.

In one implementation, movement and/or orientation of device 200 may be determined by monitoring the actual coordinates for the device 200 in a two-dimensional coordinate system compared to reference coordinates indicative of a reference position for the device 200. Such a reference position may, for example, be indicative of the "landscape" orientation of device 200. There are many ways in which such movement sensing may be realized. For example, sensors 310 may include two accelerometers, one for the horizontal and one for the vertical axis. These accelerometers may detect a total external force exerted on each accelerometer (in both horizontal and vertical axes, respectively). A reference position for the device 200 may then be defined as the position in which the accelerometer for the horizontal axis detects only the earth's gravity as the external force and where the gravity is perpendicular to the longitudinal direction of the accelerometer, while the gravity for the accelerometer for the vertical axis is directed in the longitudinal direction of that accelerometer. It is also possible to only use one accelerometer to determine the orientation of the device 200. Details about the functioning principle of an accelerometer will not be elaborated here, since they are known to the skilled person. In addition to, or as alternatives to, one or more accelerometers, other types of movement sensing units may be used, such as gyroscopes, for example.

In another embodiment, shadow/reflection identification logic 406 may monitor the subject image for predetermined shapes or silhouettes. For example, shadow/reflection identification logic 406 may compare shapes and/or images visible through lens assembly 308 to shapes stored in a database (e.g., database 402) corresponding to the user, such as images of the user's silhouette or dimension information associated with device 200. When shadow/reflection identification logic 406 determines a likely match to a stored shape or silhouette, shadow/reflection identification logic 406 may additionally determine whether the viewed image corresponds to the identified shape or silhouette by determining a direction of light source in combination with a distance to the image identified by an distance metering sensor (e.g., in sensors 308). Based on the results of these determinations, shadow/reflection identification logic 406 may determine whether the subject image includes a shadow or reflection corresponding to the user. In another implementation, shadow/silhouette recognition may be made based on Fourier descriptors associated with the image (see, for example, "Human Silhouette Recognition with Fourier Descriptors" by Diaz De Leon et al. (as found in 15th International Conference on Pattern Recognition, September 2000, 709-712 vol.3).

In some implementations, the determination regarding the direction of the light source may be made based on other ones of sensors 308, such as an additional (e.g., front facing) camera light detecting assembly, a clock, a global positioning system for determining a geographic location of device 200, etc.

Once an initial shadow/reflection portion of the subject image is identified, shadow/reflection identification logic 406 may then determine other portions of the subject image that corresponds to the user, for example, by identifying portions of the subject image optically similar to the identified portion. Once the shadow/reflection is identified, shadow/reflection identification logic 406 may determine whether the identified shadow/reflection is a shadow or a reflection. For example, in one implementation, shadow/reflection identification logic 406 may blink or periodically activate an IR metering sensor or LED (e.g., an LED used to indicate camera activity). Shadow/reflection identification logic 406 may monitor for return blinks or flashes (whether visible or in the IR spectrum) and, if corresponding blinks having at least a threshold intensity are reflected back, it may be determined that the image includes a reflection.

Once the shadow or reflection is identified and characterized, shadow/reflection identification logic 406 may perform several different actions based on device configuration settings and/or user preferences. For example, processing unit 304 may notify the user, e.g., via viewfinder 204 and/or display 214, that a shadow or reflection has been identified and may visually indicate on viewfinder 204 and/or display 214 the area identified as including the shadow or reflection. In another implementation, shadow/reflection identification logic 406 may forward information regarding the identified shadow/reflection to image processing logic 404 upon capture of the subject image by image capturing logic 408 to enable image processing logic 404 to edit or retouch a captured image to remove or recue the appearance of the identified shadow/reflection.

Image capturing logic 408 may include hardware and/or software for capturing the subject image at a point in time requested by the user. For example, image capturing logic 408 may capture and store (e.g., in database 402) the subject image visible via lens assembly 308 when the user depresses button 202. Alternatively, image capturing logic 408 may capture and store (e.g., in database 402) the subject image visible via lens assembly 308 at a predetermined time after the user depresses button 202 or in a series of sequential images.

Exemplary Processes for Identifying Shadows/Reflections

Figure 5B:
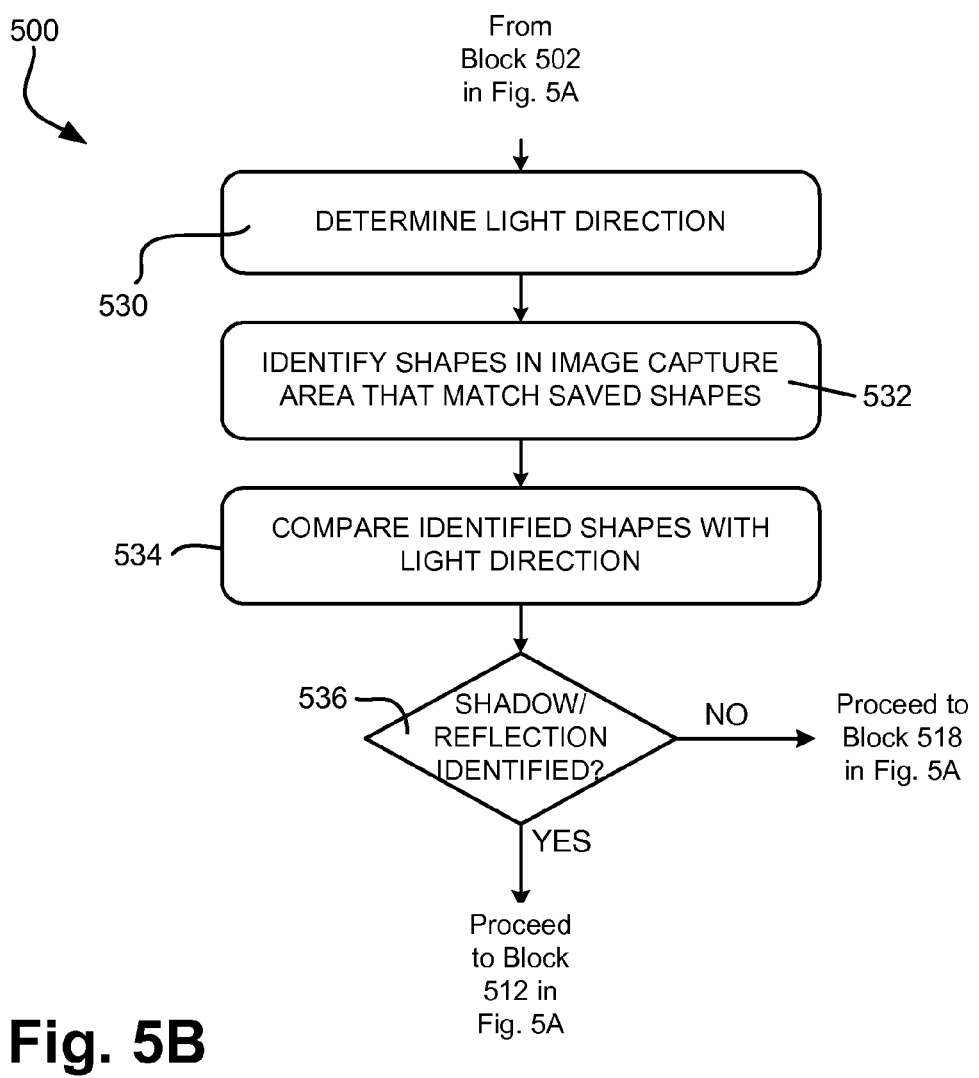

FIGS. 5A-5B show an exemplary process 500 for automatically identifying a user's shadow or a reflection in a subject image. In one implementation, process 500 may be performed by shadow/reflection identification logic 406. In another implementation, some or all of process 500 may be performed by another component of device 200, such as, for example, image processing logic 404, or processing unit 304.

As illustrated in FIG. 5A, process 500 may begin with device 200 becoming activated or powered on (block 502). In an alternative embodiment, process 500 may begin upon determination that a user is likely to capture an image. For example, factors such as how much device 200 is shaking or moving, the orientation of device 200, the amount of light that is detected by sensors 310, a detection of a subject image within a frame, etc., may be used to determine that the user is likely to capture an image. By restricting the process 500 to instances where image capturing is likely, unnecessary image analysis and processing may be reduced or eliminated.

Shadow/reflection identification logic 406 may monitor a motion of device 200 using, for example, an accelerometer or gyroscope (block 504). Shadow/reflection identification logic 406 may simultaneously (or substantially simultaneously) analyze the subject image provided by lens assembly 308 for elements sharing substantially similar movement characteristics (block 506). For example, a panning movement performed by the user (e.g., a lateral or rotational movement of the user) may cause device 200 to move in a similar or correlated manner. The movement of device 200 may be sensed by the accelerometer or gyroscope (e.g., by sensors 310). Similarly, in the event that the user's shadow or reflection is in the subject image, the user's movement of device 200 (e.g., the panning movement) may also cause a portion of the subject image to move in a substantially similar manner, this movement being captured by or "visible" to device shadow/reflection identification logic 406 via lens assembly 308.

Shadow/reflection identification logic 406 may monitor a distance to the subject (block 508). For example, a distance metering sensor included in sensors 310 may enable shadow/reflection identification logic 406 to accurately monitor a distance to the subject visible to lens assembly 308. In some implementations, the distance metering sensor may include an infra-red distance metering sensor that monitors or determines subject distance based on an infrared signal emitted by the infrared distance metering sensor. Infrared signal emitters and sensors are often used in active autofocus assemblies for camera devices.

Shadow/reflection identification logic 406 may compare the motion monitored in block 504 with the motion observed in block 506 based on the distance identified in block 508 to determine whether an image capture area includes a shadow or reflection of the user (block 510). In one embodiment, the determination of whether a shadow or reflection of the user is found in the image capture area is based on a calculated probability. For example, shadow/reflection identification logic 406 may calculate a probability of 80% that the subject image area includes a shadow or reflection. The determination of whether a probability of 80% should result in additional shadow/reflection amelioration processing may be based on a threshold value associated with this calculation. In some implementations, such a threshold may be set by the device manufacturer, while in other implementations, the threshold may be user-defined. Such a user-definition may be characterized as more aggressive or less aggressive shadow/reflection identification.

If no shadow or reflection is identified (that is, the probability of a shadow or reflection is below the predetermined threshold) (block 510—NO), process 500 may proceed to block 518 for capturing of the image without additional pre-capture or post-capture shadow/reflection related processing. However, if a shadow or reflection has been identified (block 510—YES), it may be determined whether the identified shadow/reflection is 1.) a shadow or 2.) a reflection (block 512). As briefly described above, reflectivity associated with the identified shadow/reflection may be used to determine whether the shadow/reflection is a shadow or a reflection. For example, reflections of a blinking IR metering light or other LED may be used to determine whether the image includes a reflection.

If it is determined that the shadow/reflection is a reflection (block 512—REF.), shadow/reflection identification logic 406 may notify the user (e.g., via viewfinder 204 and/or display 214 that the user's reflection is present in the image capture area (block 514). In one implementation, shadow/reflection identification logic 406 may particularly identify the portion of the subject image that includes the reflection. Additionally, shadow/reflection identification logic 406 may disable the use of flash by image capturing logic 408, or alternatively, reduce the intensity of the flash in order to prevent the reflected flash from appearing in the capture image (block 516).

Image capturing logic 408 may capture the image in the image capture area upon user command (block 518). For example, as described above, the user may depress button 202 thereby instructing device 200 to capture the image present in the image capture area. The capture image may be stored in, for example, database 402, of device 200 (block 520)

In the event that a shadow was identified (block 512—SHAD.), shadow/reflection identification logic 406 may notify the user (e.g., via viewfinder 204 and/or display 214 that the user's shadow is present in the image capture area (block 522). In one implementation, shadow/reflection identification logic 406 may particularly identify the portion of the subject image that includes the identified shadow. Additionally, shadow/reflection identification logic 406 may enable the use of flash by image capturing logic 408, or alternatively, increase or modify the intensity of the flash in order to reduce the appearance of the identified shadow in a capture image (block 524).

Image capturing logic 408 may capture the image in the image capture area upon user command (block 526). Image processing logic 404 may automatically retouch or edit the captured image to reduce or eliminate the appearance of the identified shadow in the capture image (block 528). For example, a cloning tool may be used to replace portions of the identified shadow with similar neighboring portions of the captured image that are not covered by the identified shadow. Alternatively, image processing logic 404 may increase a brightness of portions of the captured image affected by the identified image to reduce the effect of the shadow. The above-described image processing techniques are provided for exemplary purposes only. Any suitable image processing techniques may be used for reducing the effect of the identified shadow in the capture image. Following image editing, process 500 may proceed to block 520 for storing of the captured image.

In an alternative embodiment, process blocks 504-510 may include the process blocks depicted in FIG. 5B. As shown in FIG. 6, process blocks 504-510 may include determining a direction of the light source incident on the subject image in the image capture area (block 530). In some implementations, the determination regarding the direction of the light source may be made based on other ones of sensors 308, such as an additional (e.g., front facing) camera or light detecting assembly, a clock (to determine time of date and position of sun), a global positioning system for determining a geographic location or orientation of device 200, etc.

Shadow/reflection identifying logic 406 may identify shapes and/or silhouette's in the image capture area that correspond to previously stored reference shapes or silhouettes (block 532). For example, shadow/reflection identification logic 406 may compare shapes and/or images visible through lens assembly 308 to shapes stored in database 402 corresponding to the user, such as images of the user's silhouette or dimension information associated with device 200. When shadow/reflection identification logic 406 determines a likely match to a stored shape or silhouette, shadow/reflection identification logic 406 may compare the identified shapes or silhouette with the identified light source direction (block 534). Shadow/reflection identification logic 406 may determine whether a shadow or reflection corresponding to the user is viewable in the image capture area based on the comparison of block 534 (block 536).

If no shadow or reflection is identified (that is, the probability of a shadow or reflection is below the predetermined threshold) (block 536—NO), process 500 may proceed to block 518 of FIG. 5A for capturing of the image without additional pre-capture or post-capture shadow/reflection related processing. However, if a shadow or reflection has been identified (block 536—YES), process 500 may proceed to block 512 of FIG. 5A for determination regarding whether the identified shadow/reflection is 1.) a shadow or 2.) a reflection.

Alternative Implementation

Figures 6A, 6B:
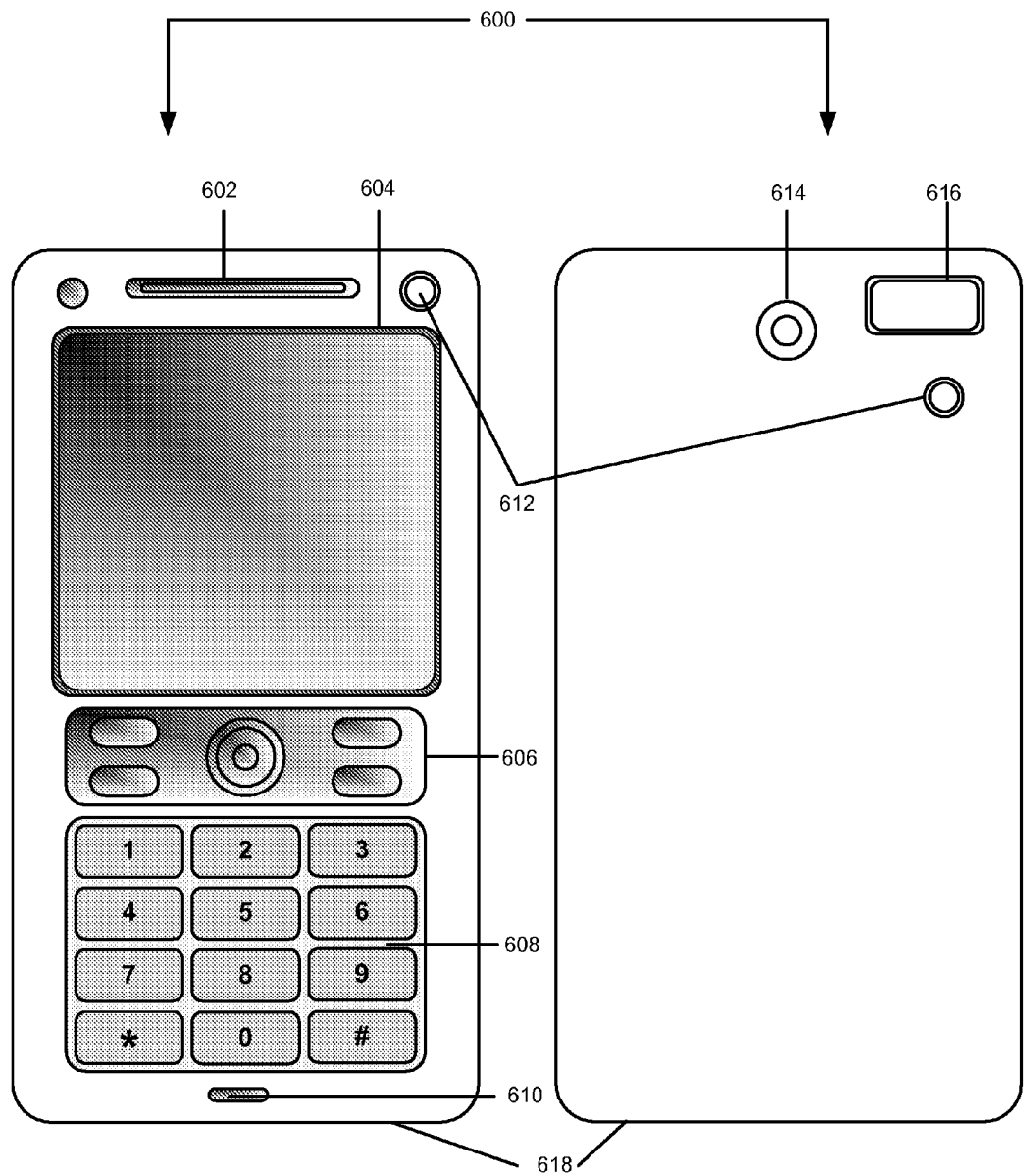
FIGS. 6A and 6B are front and rear views, respectively, of another exemplary device in which concepts described herein may be implemented.

FIGS. 6A and 6B are front and rear views, respectively, of another exemplary device 600 in which concepts described herein may be implemented. In the implementation shown, device 600 may include any of the following devices that have the ability to or are adapted to capture or process images (e.g., a video clip, a photograph, etc): a telephone, such as a radio telephone or a mobile telephone; a personal communications system (PCS) terminal that may combine a cellular radiotelephone with, data processing, facsimile, and/or data communications capabilities; an electronic notepad; a laptop; a personal computer (PC); a personal digital assistant (PDA) that can include a telephone; a video camera; a web-enabled camera or webcam; a global positioning system (GPS) navigation device; a portable gaming device; a videoconferencing system device; or another type of computational or communication device with the ability to process images.

As shown, device 600 may include a speaker 602, a display 604, control buttons 606, a keypad 608, a microphone 610, sensors 612, a lens assembly 614, a flash 616, and housing 618. Speaker 602 may provide audible information to a user of device 600. Display 604 may provide visual information to the user, such as video images or pictures. Control buttons 606 may permit the user to interact with device 600 to cause device 600 to perform one or more operations, such as place or receive a telephone call. Keypad 608 may include a standard telephone keypad. Microphone 610 may receive audible information from the user. Sensors 612 may collect and provide, to device 600, information (e.g., acoustic, infrared, etc.) that is used to aid the user in capturing images. Lens assembly 614 may include a device for manipulating light rays from a given or a selected range, so that images in the range can be captured in a desired manner. Flash 616 may include any type of flash unit used in cameras and may provide illumination for taking pictures. Housing 618 may provide a casing for components of device 600 and may protect the components from outside elements.

EXAMPLE

Figure 7A:
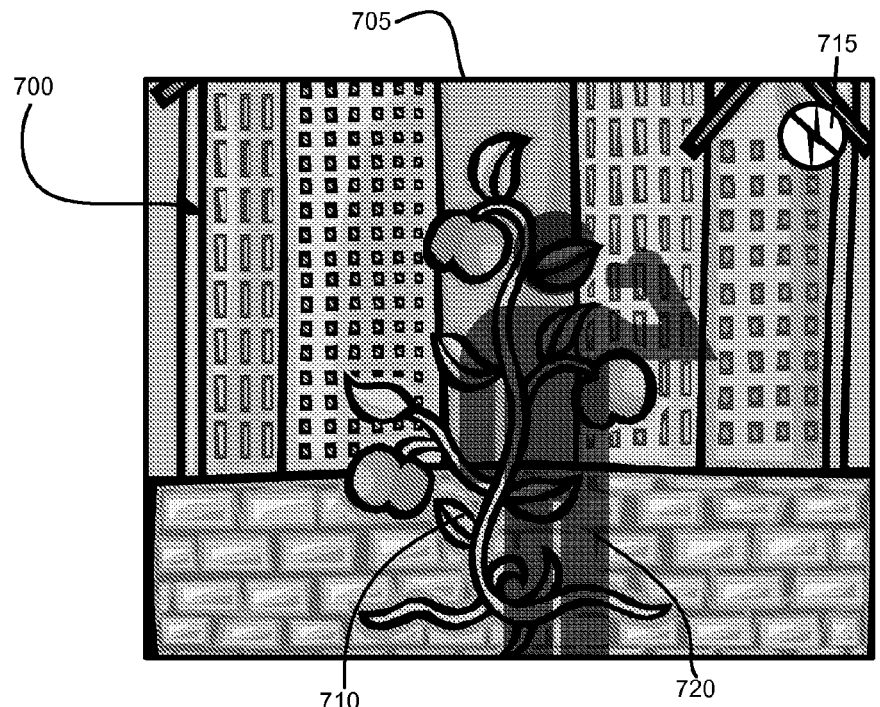
FIGS. 7A and 7B are illustration of the viewfinder/display of the device in FIGS. 2A and 2B.
Figure 7B:
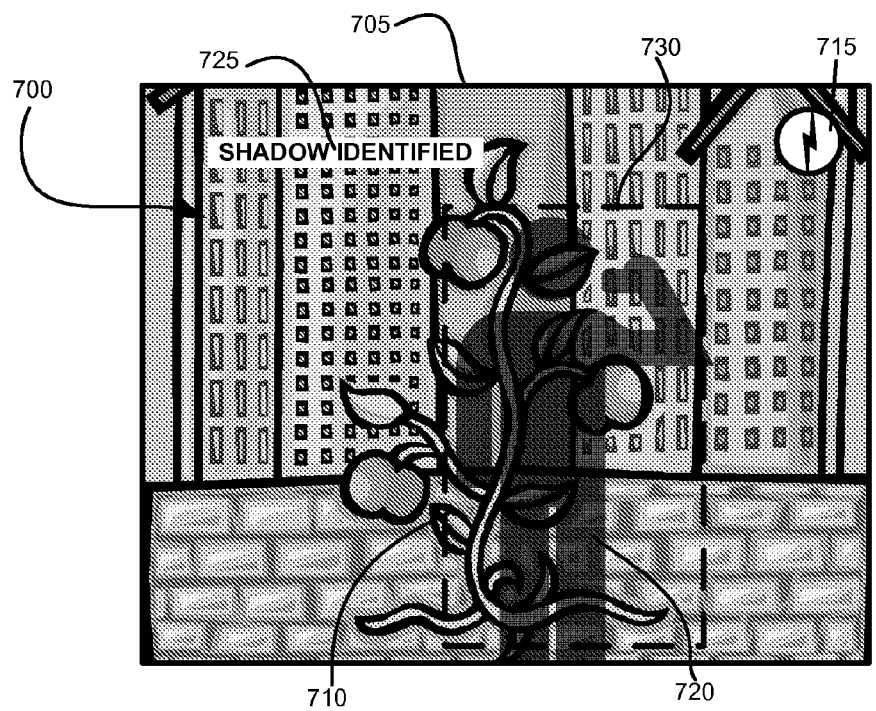
Figure 7C:
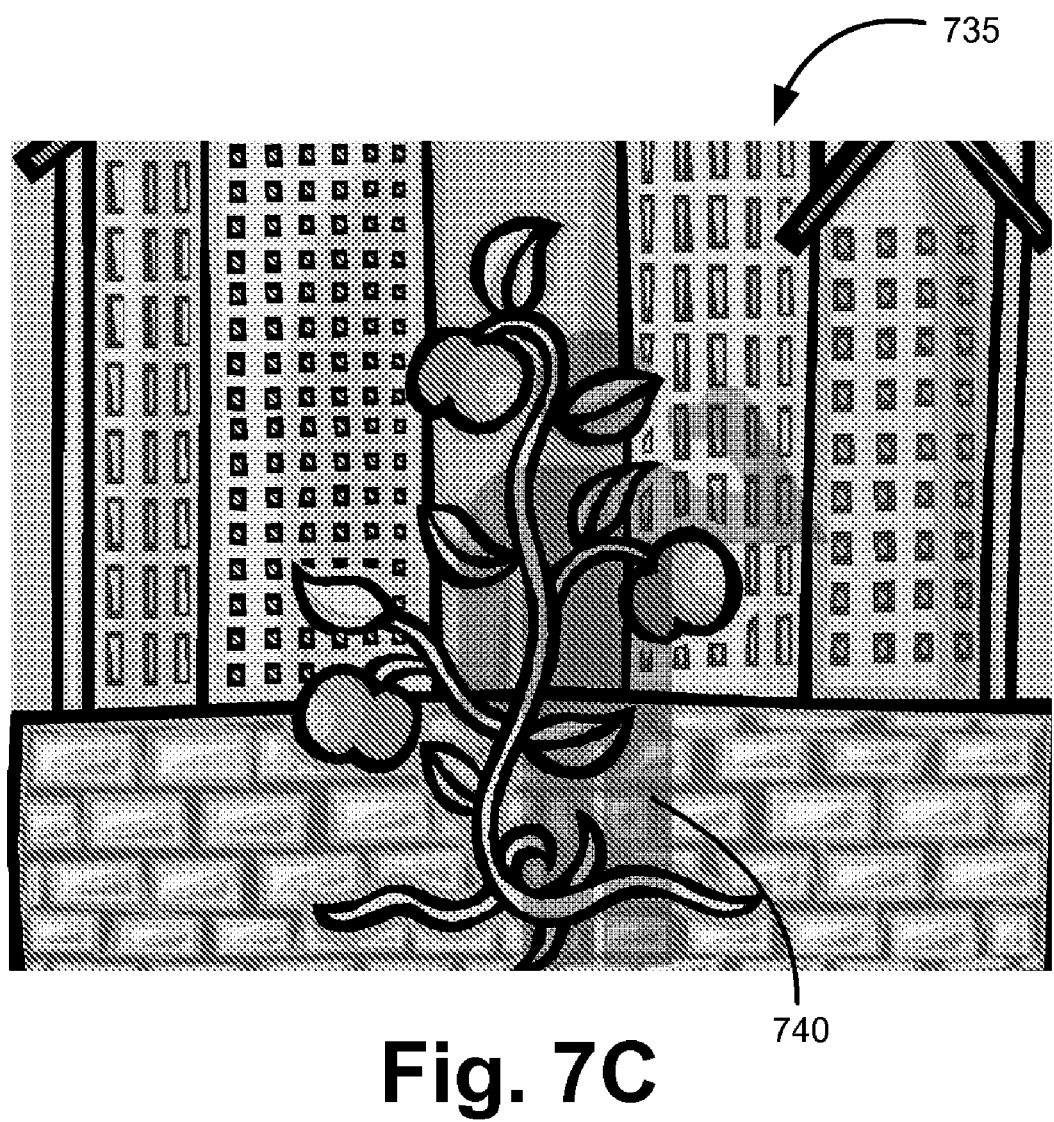
FIG. 7C illustrates a captured image based on the process of FIG. 5.

The following example illustrates processes involved in automatic timing of a photographic shot, with reference to FIGS. 7A through 7C. The example is consistent with exemplary process 500 described above with respect to FIGS. 5A and 5B.

In FIG. 7A, a user has activated device 200 and has framed an image 700 in viewfinder/display 705. Image 700 includes an image subject 710 (i.e., the tomato plant). Viewfinder/display 705 includes a flash status indication 715 that indicates that the device 200's flash is initially inactive. As shown in FIG. 7A, image 700 appears to include a shadow 720.

As set forth in detail above with respect to FIGS. 5A ad 5B, device 200 may automatically analyze image 700 in viewfinder/display 705 to determine the existence of shadow 720. For example, shadow/reflection identification logic 406 may analyze movement of device 200 relative to movement of elements of image 700. Alternatively, shadow/reflection identification logic 406 may compare elements of image 700 against previously stored shapes or silhouettes corresponding to the user. Assume for the purposes of this example, that shadow/reflection identification logic 406 has identified shadow 720.

As shown in FIG. 7B, device 200 may notify the user via viewfinder/display 705 that shadow 720 has been identified. For example, a "shadow identified" notification 725 may be provided in viewfinder/display 705 to inform the user that the shadow has been identified. Additionally, an indication 730 regarding the location of the identified shadow may also be provided in viewfinder/display 705 to assist the user in determining an appropriate response. In addition to notifying the user, device 200 may also activate the flash as indicated by flash indicator 715 in FIG. 5B. Activating the flash may reduce or eliminate the presence of shadow 720 in a captured image.

In response to the flash activation in combination with additional image processing described above, a captured image 735 (as illustrated in FIG. 7C) may include a shadow 740 having a significantly reduced intensity. In additional embodiments, the image processing described above may result in the elimination of shadow 740.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

For example, while a series of blocks has been described with regard to an exemplary process illustrated in FIGS. 5A and 5B, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:
1. A device comprising:
an image capturing assembly to frame an image of a subject for capturing; and
a processor to automatically identify a shadow or a reflection corresponding to a user of the device in the framed image,
where the image capturing assembly is configured to capture the image following the automatic identification of the shadow or the reflection, where the processor is configured to perform one of:
adjusting the image capturing assembly based on the automatic identification of the shadow or the reflection prior to the capturing of the image, or
modifying the captured image based on the automatic identification of the shadow or the reflection.

2. The device of claim 1, further comprising:
a sensor to monitor characteristics of the device and the framed image, where the automatically identifying the shadow or the reflection is based on the monitored characteristics.

3. The device of claim 2, where the sensor comprises:
a motion sensor for monitoring movement associated with the device,
where the processor is configured to determine whether movement in at least a portion of the framed image corresponds to the movement monitored by the motion sensor, and
where the processor is configured to identify the shadow or reflection when movement in at least a portion of the framed image corresponds to the movement monitored by the motion sensor.

4. The device of claim 3, where the motion sensor comprises an accelerometer, a gyroscope, or a virtual accelerometer.

5. The device of claim 3, where the sensor further comprises:
a distance meter to measure a distance from the device to the subject,
where the processor is configured to identify the shadow or reflection when movement in at least a portion of the framed image corresponds to the movement monitored by the motion sensor and further based on the measured distance.

6. The device of claim 2, where the sensor comprises:
a light direction sensor to determine a direction of light incident on the subject; and
a database to store shapes or silhouettes corresponding to the user,
where the processor is configured to:
identify shapes or silhouettes in the framed image;
determine whether an identified shape or silhouette in the framed image matches one of the shapes or silhouettes stored in the database; and
automatically identify the shadow or the reflection corresponding to the user when the identified shape or silhouette in the framed image matches one of the shapes or silhouettes stored in the database and further based on the direction of light incident on the subject.

7. The device of claim 1, where the image capturing assembly includes a lens assembly to receive the framed image and a viewfinder or display to present the framed image to the user.

8. The device of claim 7, where adjusting the image capturing assembly based on the automatic identification of the shadow or the reflection prior to the capturing of the image further comprises:
presenting a notification in the viewfinder or display, the notification indentifying the existence of the shadow or reflection.

9. The device of claim 8, where the notification identifies the location of the shadow or reflection in the framed image.

10. The device of claim 7, where adjusting the image capturing assembly based on the automatic identification of the shadow or the reflection prior to the capturing of the image further comprises:
adjusting a flash associated with the device to reduce an effect of the shadow or reflection in the captured image.

11. The device of claim 10, where adjusting the flash comprises activating or increasing the flash when a shadow is identified and deactivating or decreasing the flash when a reflection is identified.

12. The method of claim 1, where modifying the captured image based on the automatic identification of the shadow or the reflection further comprises:
automatically editing the captured image to remove the shadow or the reflection.

13. A method, comprising:
framing an image for capturing in an image capturing device, where the image includes a subject;
automatically determining whether a user-based artifact appears in the framed image; and
notifying a user of the image capturing device when user-based artifacts appear in the framed image.

14. The method of claim 13, where automatically determining whether a user-based artifact appears in the framed image comprises:
monitoring movement associated with the image capturing device;
identifying movement in the framed image;
determining whether the movement in the framed image corresponds to the movement associated with the image capturing device; and
determining that the framed image includes the user-based artifact when the movement in the framed image corresponds to the movement associated with the image capturing device.

15. The method of claim 14, where monitoring movement of the image capture device is performed by a motion sensor comprising an accelerometer, a gyroscope, or a virtual accelerometer.

16. The method of claim 14, where automatically determining whether a user-based artifact appears in the framed image comprises:
measuring a distance from the image capturing device to the subject; and
determining that the framed image includes the user-based artifact when the movement in the framed image corresponds to the movement associated with the image capturing device and further based on the measured distance.

17. The method of claim 13, where automatically determining whether a user-based artifact appears in the framed image comprises:
storing a number of shapes or silhouettes associated with the user;
determining a direction of light incident on the subject;
identifying a shape or silhouette in the framed image;
determining whether the identified shape or silhouette in the framed image matches one of the stored shapes or silhouettes associated with the user; and
determining that the user-based artifact appears in the framed image when the identified shape or silhouette in the framed image matches one of the stored shapes or silhouettes associated with the user and further based on the direction of light incident on the subject.

18. The method of claim 13, further comprising:
capturing the framed image;
automatically editing the captured image to reduce an effect of the user-based artifact on the captured image; and
storing the captured image.

19. A device, comprising:
- means for framing an image of a subject for capturing;
- means for automatically identifying a shadow corresponding to a user of the device in the framed image;
- means for notifying the user about the identified shadow;
- means for capturing the framed image based on the identified shadow, such that effects of the identified shadow in the captured image are reduced; and
- means for storing the captured image.

20. The device of claim 19, where the means for capturing the framed image based on the identified shadow, such that effects of the identified shadow in the captured image are reduced, further comprise at least one of:
- means for adjusting a flash during capturing of the image to reduce the effects of the identified shadow; or
- means for automatically editing the captured image to remove the identified shadow.

* * * * *